(12) United States Patent
Marimuthu

(10) Patent No.: US 9,810,538 B2
(45) Date of Patent: Nov. 7, 2017

(54) APPARATUS, METHOD, AND SYSTEM FOR PROVIDING BEACON-BASED NAVIGATION

(71) Applicant: Verizon Patent and Licensing Inc., Arlington, VA (US)

(72) Inventor: Ramesh Marimuthu, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 14/466,649

(22) Filed: Aug. 22, 2014

(65) Prior Publication Data
US 2016/0054130 A1 Feb. 25, 2016

(51) Int. Cl.
G01C 21/20 (2006.01)

(52) U.S. Cl.
CPC .................. *G01C 21/206* (2013.01)

(58) Field of Classification Search
CPC .............................. G01C 21/20; G01C 21/206
See application file for complete search history.

(56) References Cited

U.S. PATENT DOCUMENTS

| 7,039,522 B2 * | 5/2006 | Landau | A61H 3/061 340/539.11 |
| 9,204,257 B1 * | 12/2015 | Mendelson | G08G 1/14 |
| 2013/0131971 A1 * | 5/2013 | Parrish | G06F 3/01 701/408 |
| 2015/0123770 A1 * | 5/2015 | Jones | G06K 7/10366 340/10.1 |

* cited by examiner

*Primary Examiner* — Mussa A Shaawat
*Assistant Examiner* — Michael Kerrigan

(57) ABSTRACT

A guidance platform for providing guidance information is disclosed. The guidance platform receives a request from a user to navigate to a destination point. Based on the request, the guidance platform calculates a route to the destination point from a current location of the user. Further, the guidance platform selects guidance beacons installed along the calculated route. The guidance platform then activates the guidance beacons to initiate a presentation of the guidance information to the user.

18 Claims, 12 Drawing Sheets

APPARATUS, METHOD, AND SYSTEM FOR PROVIDING BEACON-BASED NAVIGATION

BACKGROUND INFORMATION

It is a challenge for a physically disabled or a visually impaired person to navigate in an indoor environment independently, particularly in spaces visited for the first time. Further, several everyday objects that are present in buildings (for example, chairs, tables, stairs etc.) may hinder their movements and may cause serious accidents by putting at risk their physical integrity. The available technology for overcoming the difficulties associated with movement from one place to another for physically disabled or a visually impaired person remains limited, for example, audio systems installed at a specific location to provide an audio guide does not provide any navigation or directions. Further, conventional navigation systems do not provide detailed and/or step-by-step navigation information inside a building.

Based on the foregoing, techniques are desired for providing navigation assistance to a physically disabled or a visually impaired person within a physical space.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing navigation aid to users, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
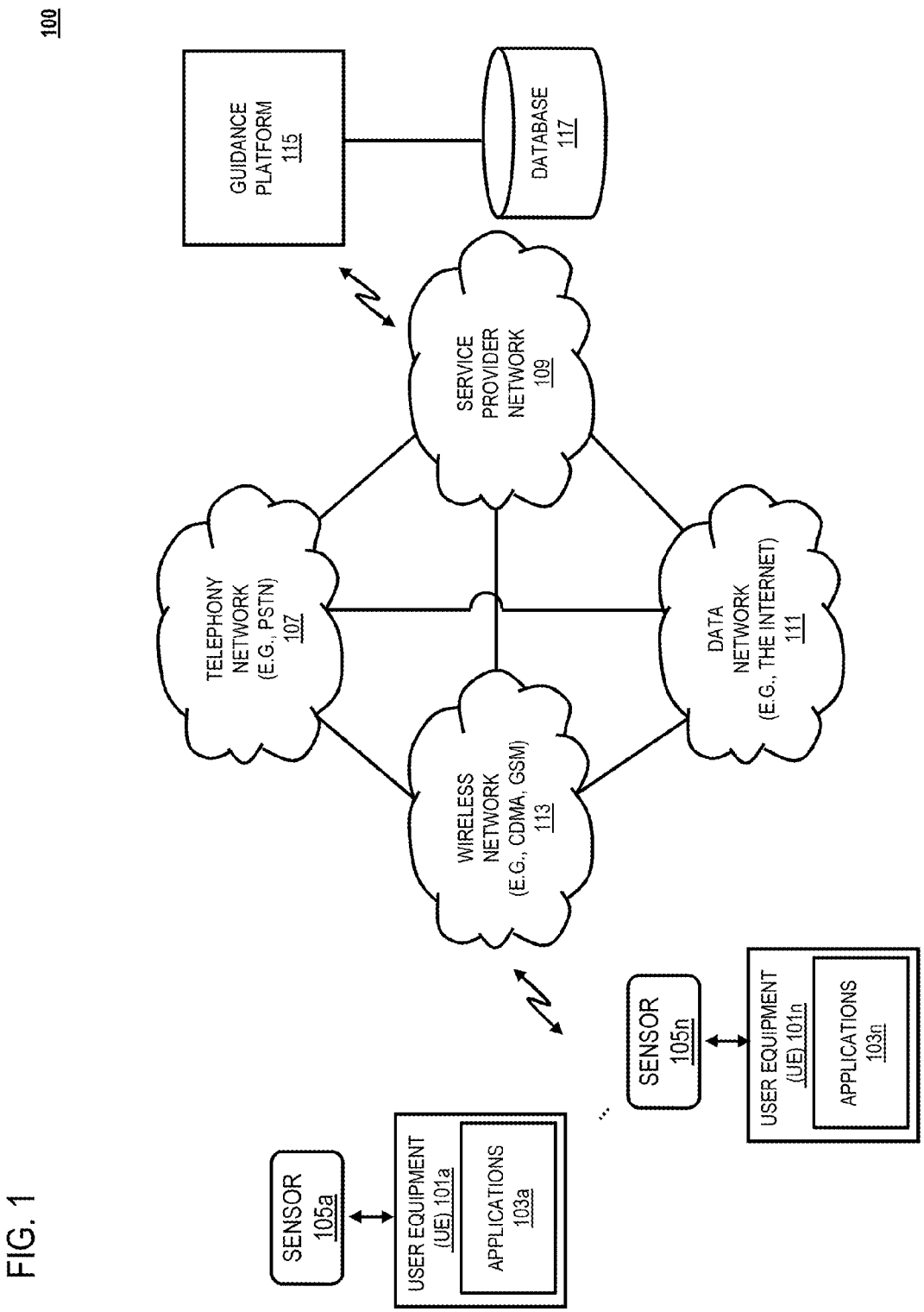
FIG. 1 is a diagram of a system for providing guidance information to users, according to one embodiment.

FIG. 1 is a diagram of a system for providing guidance information to users within a physical space, according to one embodiment. In one implementation, the guidance information provided to the users may include, but is not restricted to, a route to a destination point, obstacles in a navigation route, etc. The physical space may include, but is not restricted to, a home, a shopping mall, a museum, a building, and the like. In one embodiment, a system 100 may be capable for providing guidance information to visually impaired and/or disabled individuals. In another embodiment, the system 100 may be capable for providing guidance information to any users who are unfamiliar with directions towards a particular destination, or to any users who wishes to use the navigation services. In one scenario, the system 100 may be capable of providing guidance information to any users to reach their destination point within a new or unacquainted physical space such as a parking lot.

For the purpose of illustration, the system 100 employs, in certain embodiments, user equipment 101a-101n, hereinafter referred to as beacon device 101. Generally, a beacon is a device that is used to guide and/or navigate users to their destination points. In one embodiment, the beacon device 101 may include, but is not restricted to, a laptop, a Personal Digital Assistance (PDA), a tablet, a smart phone, a palmtop, and the like. The beacon device 101 may further include applications 103a-103n, hereinafter referred to as application 103 for providing guidance information to the users. In one embodiment, the application 103 may be used to communicate with guidance beacons or sensors 105a-105n, hereinafter referred to as guidance beacon 105. In one implementation, the beacon device 101 may communicate with the guidance beacon 105 through various short range networks, but is not limited to, WiFi, Long-Term Evolution (LTE), Bluetooth, Infrared, Near Field Communication (NFC), and the like. In one embodiment, a guidance beacon 105 may include a light emitting diode (LED) with different colors and/or lighting patterns, a sound emitting device, or combination thereof. In another embodiment, a guidance beacon 105 may include speech sensors, acceleration sensors, position sensors, near field communication sensors, speedometer, gyroscope, or a combination thereof. In one scenario, the beacon device 101 may monitor the health condition of a user. For example, the beacon device 101 may monitor the physical activities undertaken by a user to determine the distance travelled, the calories burned, etc. In addition, the guidance beacon 105 may determine the blood pressure level, the sugar level, etc., for a user. Then, the guidance platform 115 may deliver such health related data to the user's physician or medical representative or a health server for processing.

In one embodiment, the guidance beacon 105 may be installed within the beacon device 101. In another embodiment, the guidance beacon 105 may be installed at different positions of the physical space. The different positions of the physical space may include, but is not restricted to, walls, ceilings, floors, or a combination thereof. Further, the guidance beacon 105 may be fixed within the system 100, in one embodiment. For example, the guidance beacon 105 may be fixed at different positions of the physical space. In another embodiment, the guidance beacon 105 may be a mobile guidance beacon 105. For example, the guidance beacon 105 may be mounted on a track installed in the ceiling of the physical space, which may move to provide guidance information to the users. Such guidance beacon 105 may follow a user to track user movement as opposed to pre-positioned sensors.

Further, the guidance beacon 105 may provide the guidance information to the users by providing audio or visual alerts. In one embodiment, the guidance beacon 105 produce audio alerts, for example, go straight, turn left after 5 steps, etc. In another embodiment, the guidance beacon 105 produce visual alerts by, for example, emitting light on a navigation route, displaying navigation signs on a display device, and the like. In yet another embodiment, the guidance beacon 105 installed in the key points within a facility or a locality may provide audio and video alerts to the beacon device 101. In one implementation, the guidance beacon 105 may generate different alerts for different users in the physical space. In one scenario, there may be different audio alerts for different users, and if one or more beacon device 101 passes by the at least one guidance beacon 105 at the same time, then the guidance beacon 105 may play audio alerts in a preference based manner to avoid any confusion.

In another embodiment, the application 103 of the beacon device 101 may receive inputs from the user. The inputs may include, but is not restricted to, a current location to a destination point, a destination point, and the like. In one embodiment, the user may provide speech inputs, textual inputs, and the like. In one scenario, the beacon device 101 may sense natural language (e.g., imitating certain activities), written sign language (e.g., drawing signs on the sensor pad of the device 101), physical actions, etc. Further, the application 103 of the beacon device 101 may transmit the inputs to a guidance platform 115.

The beacon device 101 may communicate with the guidance platform 115 through various networks including a telephony network 107, a service provider data network 109, a data network 111, a wireless network 113, and the like. For illustrative purposes, the networks 107-113 may be any suitable wireless networks, and are managed by service providers. For example, the telephony network 107 may include, but is not restricted to, a circuit-switched network, such as the Public Switched Telephone Network (PSTN), an Integrated Services Digital Network (ISDN), a Private Branch Exchange (PBX), or other like networks.

Although depicted as separate entities, the networks 107-113 may be completely or partially contained within one another, or may embody of the aforementioned infrastructures. For instance, the service provider network 109 may embody circuit-switched and/or packet-switched networks that may include facilities to provide for transport of circuit-switched and/or packet-based communications. It is further contemplated that the networks 107-113 may include components and facilities to provide signaling and/or bearer communications between the various components or facilities of the system 100. In this manner, the networks 107-113 may embody or include portions of a signaling system 7 (SS7) network, or other suitable infrastructure to support control and signaling functions. In addition, the system 100 may operate as separate parts that rendezvous and synchronize periodically to form a larger system with similar characteristics.

Further, the data network 111 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, wireless network 113 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like.

The guidance platform 115 may receive the inputs from the beacon device 101 to navigate the user to the desired destination point. The guidance platform 115 may then process the received inputs. In one implementation, the guidance platform 115 utilizes the inputs received from the user to determine a current location of the user, a current location of the beacon device 101, or a combination thereof within the physical space. Further, the guidance platform 115 may calculate a route from the current location of the user, the beacon device 101, or a combination thereof to the desired destination point. Further, the guidance platform 115 may select one or more guidance beacon 105 installed along the route. In one embodiment, the guidance beacon 105 may be selected based on the calculated route. For example, all guidance beacon 105 installed in the physical space on a route to the desired destination point are selected by the guidance platform 115. Further, the guidance platform 115 may activate the selected guidance beacon 105 to initiate a presentation of the guidance information to the user. The components of the guidance platform 115 are described in conjunction with FIG. 2.

Further, the guidance platform 115 is connected to a database 117. The database 117 may include data associated with the users, the physical space, or a combination thereof. In one embodiment, the database 117 may include coordinates of the physical space. The coordinates may include, but is not restricted to, latitude, longitude, a section, and the like of the physical space. In another embodiment, the database 117 may store pre-defined routes from one point to another within the physical space. For example, the database 117 may store pre-defined routes within a home, for example, from a living room to a bedroom, from a living room to a kitchen, from a bedroom to a lobby, and the like. In yet another embodiment, the database 117 may store profiles of the users. The user profile may include, but is not restricted to, a name, personalized preferences, device configuration, etc. The personalized preferences of the user may include, but is not restricted to, receive alerts as computerized speech alerts, visual alerts, alerts by using customized family member's voice, and the like.

Figure 2:
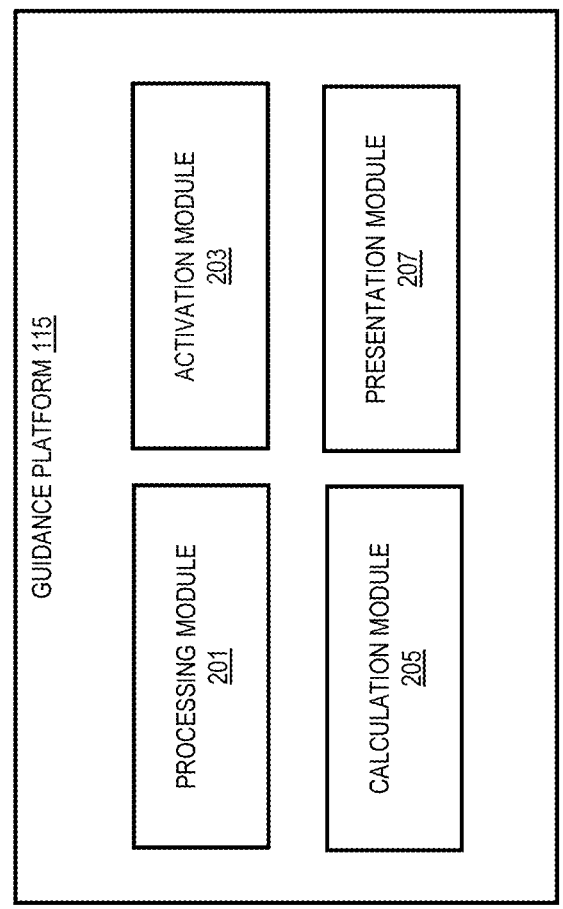
FIG. 2 is a diagram of components of a guidance platform for providing guidance information to users, according to one embodiment.

FIG. 2 is a diagram of components of the guidance platform 115 for providing guidance information to users, according to one embodiment. The guidance platform 115 may include a processing module 201, an activation module 203, a calculation module 205, and a presentation module 207.

The processing module 201 may receive a request from a user to provide guidance information to a desired destination point. In one scenario, a navigation request may be provided by a user via a touch-based interaction, a gesture-based interaction, an audio interaction, or a combination thereof. In one embodiment, the processing module 201 may receive the request as a natural language input such as speech of the user. In one scenario, a user of a beacon device 101 presses a Push-to-Talk (PTT) button and speak in to the beacon device 101 to request for an initiation of a guidance information to a desired destination point. In another embodiment, the processing module 201 may receive the request as a text message from the beacon device 101. In one implementation, the processing module 201 may receive names of a source point and a desired destination point. For example, the user of the beacon device 101 provides an input such as a living room to a bedroom. Further, the processing module 201 processes the received request to determine a location of the beacon device 101, the user, or a combination thereof. The processing module 201 determines that the user is currently present at the living room and desires to go to the bedroom. In one embodiment, the processing module 201 processes the received request based on proximity information. In another embodiment, the processing module 201 processes the received request based on signal information such as strengths of the signals are determined to calculate a current location of the beacon device 101, the user, or a combination thereof along a route to the destination point.

In another embodiment, the processing module 201 may receive name of the desired destination point as an input. For example, the user of the beacon device 101 provides an input such as bedroom. Then, the processing module 201 processes the request to determine and/or calculate a current location of the user, the beacon device 101, or a combination thereof. In one embodiment, the processing module 201 may determine a current location of the user by using predefined mathematical algorithms. In one implementation, the processing module 201 may utilize triangulation techniques to determine the current location of the user, the beacon device 101, or a combination thereof. In another implementation, the processing module 201 may utilize quadrangulation techniques to determine the current location of the user, the beacon device 101, or a combination thereof.

Further, the processing module 201 may receive another input to initiate personalized or customized guidance information. The personalized guidance information may include, but is not restricted to, receive personalized audio alerts, visual alerts, or a combination thereof. The processing module 201 may further, request the user for a user interaction with the guidance beacon 105 to indicate that the user of the beacon device 101 has reached one of the guidance beacon 105.

The activation module 203 may select one or more guidance beacon 105 installed and/or mounted along a route to the desired destination point from the current location of the user, the beacon device 101, or a combination thereof. For example, 6 guidance beacons (B1-B6) are installed along a route from the living room to the bedroom then these 6 guidance beacons (B1-B6) are selected by the activation module 203. Further, the activation module 203 may activate these 6 guidance beacons (B1-B6). In one embodiment, the activation module 203 may activate these guidance beacons (B1-B6) based on a sequence and/or progress of the user, the beacon device 101, or a combination thereof to the destination point. For example, a guidance beacon B1 is nearest to the user and is therefore activated first, then guidance beacon B2, and so on. In another embodiment, the activation module 203 may activate the guidance beacon 105 simultaneously. For example, the guidance beacons (B1-B6) installed along a route from the living room to the bedroom may be activated simultaneously. In an exemplary embodiment, when the user crosses a guidance beacon B1, then it is reset and a second guidance beacon B2 is activated, and the process continues till the user reaches to the desired destination point.

The calculation module 205 may calculate a route based on the inputs received from the user. In one embodiment, the calculation module 205 may calculate a least path from the current location of the user, the beacon device 101, or a combination thereof to the desired destination point. For example, if there are multiple paths to reach from the living room to the bedroom, then a shortest path from the living room to the bedroom is calculated. In another embodiment, the calculation module 205 may calculate a route having a least number of obstacles. For example, if there are multiple paths to reach to the bedroom from the living room then a route having a least number of obstacles such as a table, sofa, and the like is calculated. In yet another embodiment, the calculation module 205 may calculate a route having a maximum number of guidance beacon 105. For example, a route that may have a maximum number of the guidance beacon 105 installed in it is calculated. In another embodiment, the calculation module 205 may calculate the route based on, but is not restricted to, the least path, the least obstacles, the maximum number of the guidance beacons, or a combination thereof.

Further, the calculation module 205 may sense the user, the beacon device 101, an obstacle, or a combination thereof along the calculated route. In one embodiment, the user, the beacon device 101, the obstacles, or a combination thereof along the route may be detected by using sensors installed in the beacon device 101. In another embodiment, the user, the beacon device 101, the obstacles, or a combination thereof along the calculated route may be detected by using sensors installed in the guidance beacon 105. In yet another embodiment, the user, the beacon device 101, the obstacles, or a combination thereof along the calculated route may be detected by using sensors installed on the beacon device 101, the guidance beacon 105, or a combination thereof. The sensor may include, but is not restricted to, a heat sensor, a motion sensor, a radar sensor, or a combination thereof.

The presentation module 207 may initiate a presentation of the guidance information to the beacon device 101, the user, or a combination thereof. In one embodiment, the guidance beacon 105 is configured with an audio alert system, a visual alert system, or a combination thereof. In one implementation, the audio alert systems and the visual alert systems may be activated by the activation module 203. The presentation module 207 may present audio alerts to the user. For example, an audio alert such as a computerized speech, a beeping sound, a tone, and the like may be provided to the user to guide him to the desired destination point.

In another embodiment, the presentation module 207 may present visual alerts to the user. In an exemplary embodiment, lights are emitted on the calculated route as the guidance information to the user. In another exemplary embodiment, a visual alert may be presented to the user by displaying navigation signs on a display device. Further, the presentation module 207 may present personalized audio alerts to the user based on the personalized preferences of the user. For example, a personalized guidance information such as a customized recorded voice of a user's family member (e.g., son) may be used, for example, "Dad follow me", or "let me take you to the bedroom", etc. Further, the presentation module 207 may generate multiple alerts for different users, in case, they pass through a same guidance beacon 105. In one embodiment, the presentation module 207 may play auditory alerts based on the personalization of the users to avoid confusions. In one scenario, if a user misplaces his/her beacon device 101, the user may utter "find my beacon", whereupon the voice command given by a user is identified by the guidance beacon 105. The guidance beacon 105 may transmit the request to the guidance platform 115. Then, the guidance platform 115 may locate the location for the beacon device 101, at which point the guidance beacon 105 may guide the user towards the beacon device 101. Further, the guidance platform 115 and/or the guidance beacon 105 may communicate with the beacon device 101 to cause an activation of an audible alarm and/or a vibration at the beacon device 101. The user may simply follow the audible alarm and/or the vibration to locate the beacon device 101.

Figure 3:
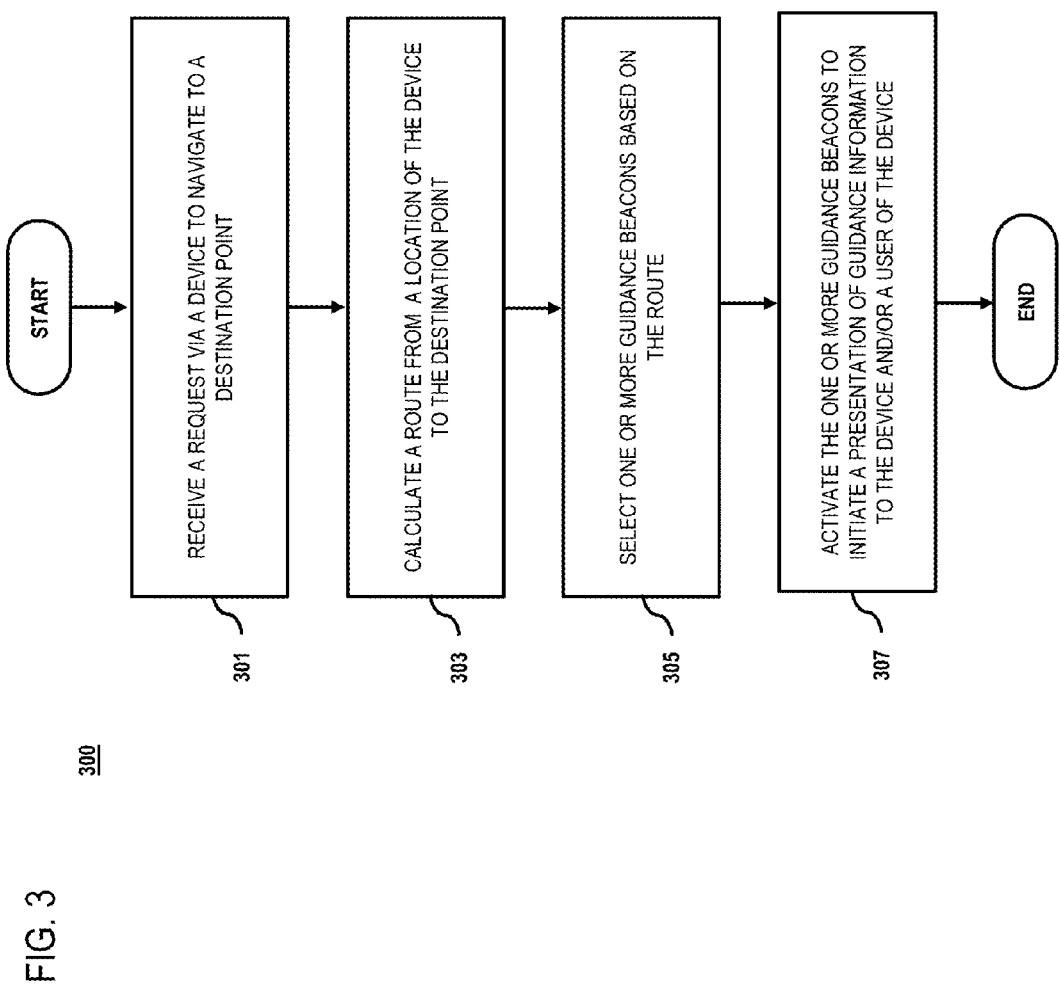
FIG. 3 is a flowchart of a process for providing guidance information to users, according to one embodiment.

FIG. 3 is a flowchart of a process for providing guidance information to users, according to an embodiment. At step 301, a guidance platform 115 receives a request via a beacon device 101 to navigate to a destination point. In one embodiment, the request may be received as a speech input, for example, a user presses a Push-to-Talk (PTT) button of the beacon device 101 and speaks a name of the destination point. In another embodiment, the request may be received as a text message from the beacon device 101. The request may include names of, but is not limited to, a source point, a destination point, or a combination thereof.

At step 303, the guidance platform 115 calculates a route from a location of the beacon device 101 to the destination point based on the request. In one embodiment, the guidance platform 115 may calculate a least path. For example, if there are multiple paths to reach from a living room to a bedroom, then a shortest path from the living room to the bedroom is calculated. In another embodiment, the guidance platform 115 may calculate a route having a least number of obstacles. For example, if there are multiple paths to reach from the living room to the bedroom then a route having a least number of obstacles such as a table, sofa, and the like is calculated.

In yet another embodiment, the guidance platform 115 may calculate a route having a maximum number of guidance beacons 105. For example, a route that may have a maximum number of the guidance beacon 105 installed in it is calculated. In another embodiment, the guidance platform 115 may calculate the route based on the least path, the least obstacles, the maximum number of the guidance beacon 105, or a combination thereof.

Next, at step 305, the guidance platform 115 selects guidance beacons 105 based on the calculated route. In one embodiment, guidance beacons 105 installed along the calculated route from the location of the beacon device 101 to the destination point are selected.

Thereafter, at step 307, the guidance platform 115 activates the guidance beacons 105 to initiate a presentation of guidance information to the beacon device 101, the user, or a combination thereof. In one embodiment, the guidance platform 115 may activate these guidance beacons 105 based on a sequence and/or progress of the user, the beacon device 101, or a combination thereof, to the destination point. For example, a guidance beacon B1 is nearest to the user and/or the beacon device 101 is activated first, then a second guidance beacon B2 is activated, and so on. In another embodiment, the guidance platform 115 may activate all the selected guidance beacons 105 simultaneously.

Figure 4:
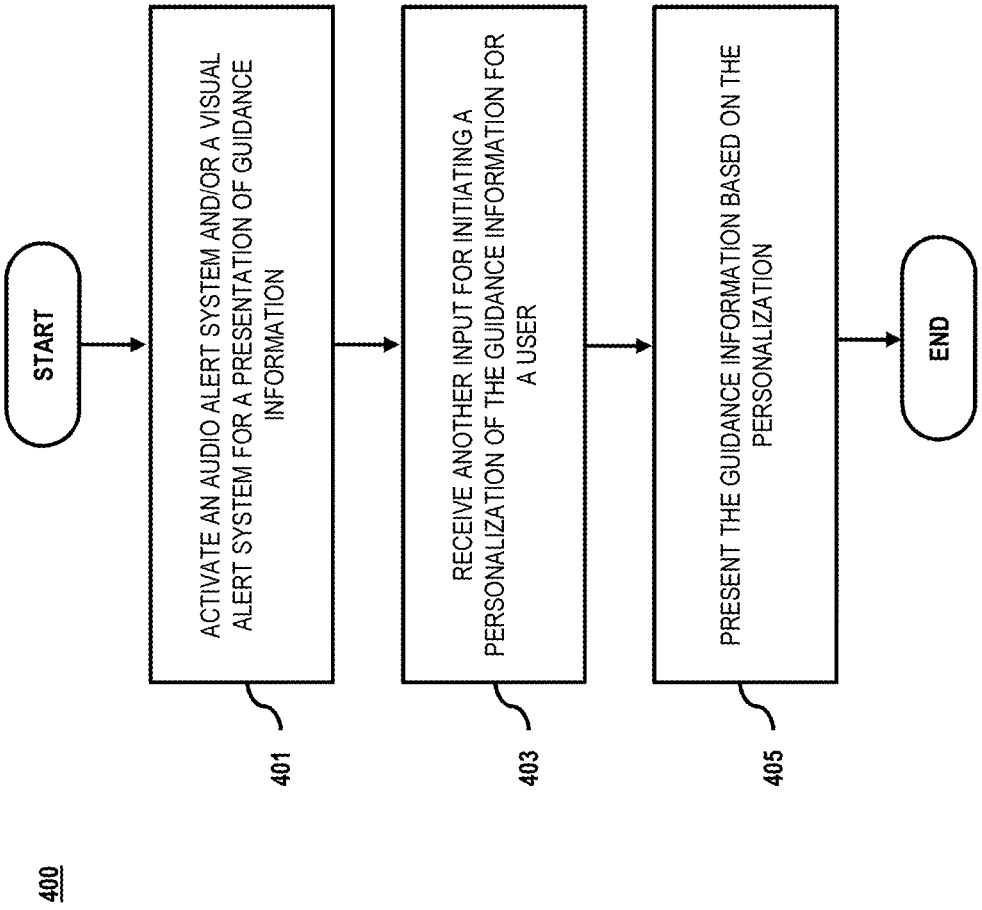
FIG. 4 is a flowchart of a process for configuring a beacon device, according to another embodiment.

FIG. 4 is a flowchart of a process for configuring a beacon device 101, according to an embodiment. At step 401, a guidance platform 115 activates an audio alert system and/or a visual alert system for a presentation of guidance information. In one embodiment, the guidance platform 115 may receive a navigation request from a device associated with a user to a specific point of interest. Then, the guidance platform 115 may process the navigation request for determining the location of a device associated with the user. Subsequently, the guidance platform 115 may cause an activation of plurality of sensors, plurality of beacons, or a combination thereof installed in the key areas of the known locations (e.g., building floor plan). Then, the guidance platform 115 may cause an initiation of a navigation aid for directing a user to a specific point of interest. In one embodiment, if a user of the beacon device 101 desires to receive audio alerts then the guidance platform 115 activates the audio alert system associated with guidance beacon 105. In another embodiment, if the user of the beacon device 101 desires to receive visual alerts then the guidance platform 115 activates the visual alert system associated with guidance beacon 105. In one scenario, the visual alert system may include, but is not restricted to, light bulbs to navigate the user to the destination point.

At step 403, the guidance platform 115 receives another input for initiating a personalization of the guidance information to the user. In one embodiment, the guidance platform 115 receives an input from the user of the beacon device 101 to provide personalized guidance information. The personalization may include, but is not restricted to, receive personalized audio alerts, visual alerts, or a combination thereof. For example, an audio alert may be generated by using pre-recorded speech of a family member. In an exemplary embodiment, for a visually-impaired person, a personalized guidance information such as a personalized recorded voice of his grandson may be used, for example, "grandpa follow me", or "let me take you to the bedroom", etc. In another exemplary embodiment, a visual alert having an image of a family member is displayed to the user along with the guidance information. In one scenario, the beacon device 101 may be used to remind elderly/disabled users to perform certain activities in a timely fashion, for example, taking medications on time, eating on time, exercising on time, or perform any other activities on a punctual basis. In another scenario, the beacon device 101 may be remotely controlled by the custodian of that user by setting up a calendar of activities at the server level. The custodian may have access to the server through a portal that includes a reverse parental control mobile application.

Next, at step 405, the guidance platform 115 presents the guidance information to the user based on the personalization. In one scenario, the guidance platform 115 may cause an activation of distinctive audio instructions, visual instructions, vibratory instructions, or a combination thereof to one or more users based on proximity information, signal information, contextual information, or a combination thereof. In one example embodiment, the guidance platform 115 may provide location prompt information to the user (e.g., predefined guidance prompts from the system based on location names (e.g., kitchen, bathroom)) for the user to speak or show. This allows the user to define the locations, and walk around the building reading the prompts as provided by the system. In another scenario, the guidance platform 115 may cause a provisioning of a navigation aid to a specific point of interest based on user preference, wherein a navigation aid may include personal recordings, preferred aural instructions, preferred visual instructions, or a combination thereof.

Figure 5:
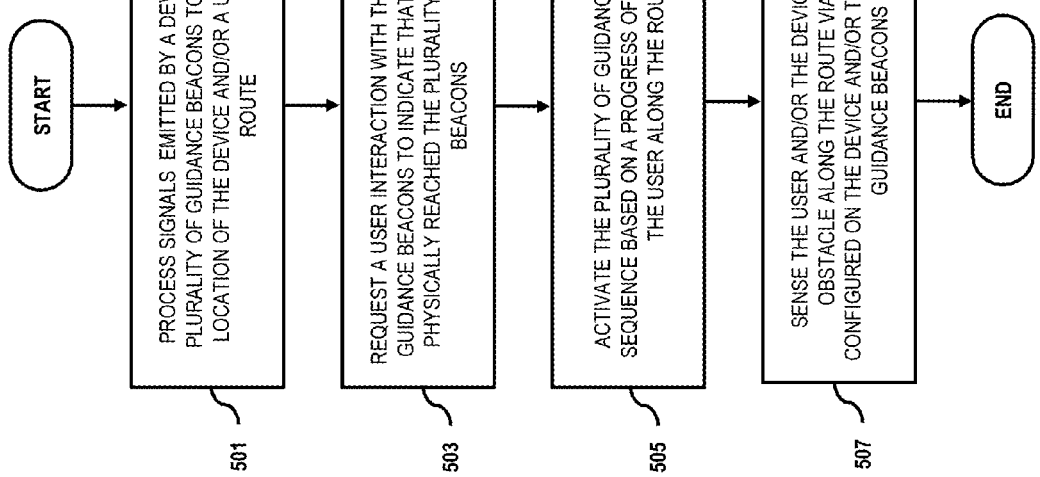
FIG. 5 is a flowchart of a process for processing a user request, according to one embodiment.

FIG. 5 is a flowchart of a process for processing a user request, according to an embodiment. At step 501, a guidance platform 115 processes signals emitted by a beacon device 101 and/or guidance beacon 105 to calculate a location of the beacon device 101 and/or user of the beacon device 101 along a route. In one embodiment, the beacon device 101 communicates with guidance beacon 105 based on proximity information. The signals emitted from the guidance beacon 105 may include, but is not restricted to, Bluetooth signals, WiFi signals, Long-Term Evolution (LTE) signals, Infrared signals, radar signals, and the like. In another embodiment, signal information such as strengths of the signals are determined to calculate a current location of the beacon device 101, the user, or a combination thereof along the route to the destination point. In a further embodiment, both the beacon device 101 and the guidance beacon 105 may sense the propagation and the direction of electromagnetic waves, for example, radio waves used by a radar.

Further, at step 503, the guidance platform 115 requests the user for a user interaction with the guidance beacon 105 to indicate that the user has physically reached the guidance beacon 105. For example, if the user has reached a first guidance beacon B1 along the route then a user interaction such as press a button to switch off alert sound of the first guidance beacon B1 is requested. In one embodiment, the guidance platform 115 may cause a repetition of a navigation aid to a specific point of interest based on proximity information between a device associated with a user and a sensor, a beacon, or a combination thereof. In another embodiment, the guidance platform 115 may cause a change in a navigation aid based on unresponsiveness on part of a user within a predetermined time threshold.

Thereafter, at step 507, the guidance platform 115 activates the guidance beacon 105 in a sequence and/or based on a progress of the user, the beacon device 101, or a combination thereof, along the route to the destination point. For example, a guidance beacon B1 is nearest to the user and/or the beacon device 101 is activated first, then a second guidance beacon B2 is activated, and so on till the user of the beacon device 101 reaches the destination point.

At step 507, the guidance platform 115 senses the user, the beacon device 101, an obstacle, or a combination thereof along the route. In one embodiment, the user, the beacon device 101, the obstacles, or a combination thereof along the route may be detected by using sensors installed in the beacon device 101. In another embodiment, the user, the beacon device 101, the obstacles, or a combination thereof along the route may be detected by using sensors installed in the guidance beacon 105. In yet another embodiment, the user, the beacon device 101, the obstacles, or a combination thereof along the route may be detected by using sensors installed in the beacon device 101, the guidance beacon 105, or a combination thereof. The sensor may include, but is not restricted to, a heat sensor, a motion sensor, a radar sensor, or a combination thereof.

Figure 6:
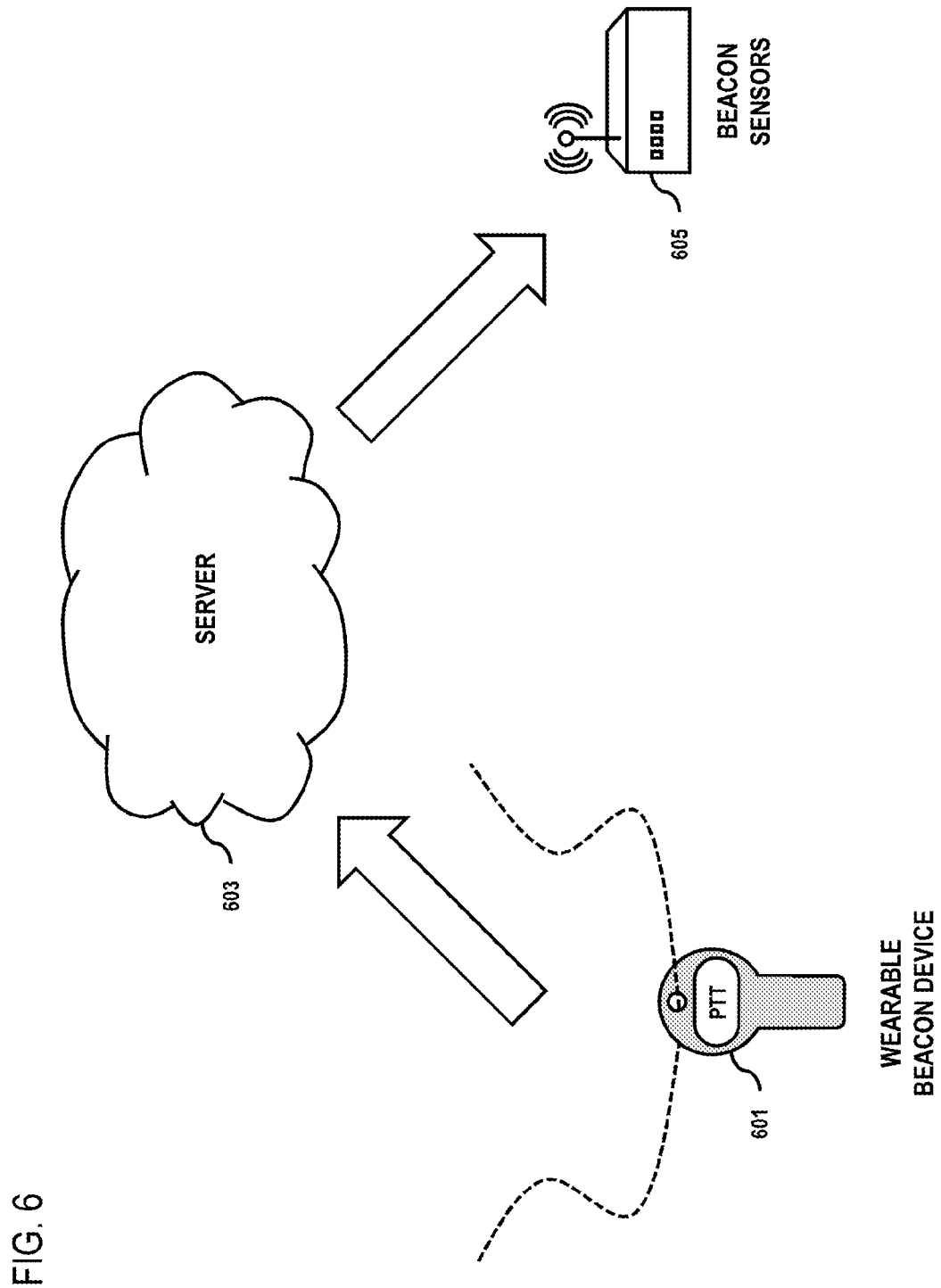
FIG. 6 is a diagram for illustrating communication between a beacon device and beacon sensors, according to one embodiment.

FIG. 6 is a diagram for illustrating communication between a beacon device and beacon sensors, according to an embodiment. A wearable beacon device 601 may be worn by a user. In an embodiment, the user may hang the wearable beacon device 601 on his neck, for example, a key fob hangs on a chain. In another embodiment, the user may wear the beacon device 601 on a wrist as a wrist band. The wearable beacon device 601 may be pinned on the user's shirt close to the user's face, according to one embodiment. The user of the wearable beacon device 601 may request a server to navigate to a destination point. For this purpose, the user may provide inputs by using a button such as a Push-to-Talk (PTT) button on the wearable beacon device 601. In one embodiment, the input may include but is not limited to, names, a destination point, a source point, or a combination thereof. The inputs provided by the user may be a natural language input. The wearable beacon device 601 transmits the request to a server 603. In one embodiment, the server 603 may be a cloud server. Further, based on the inputs provided by the user, the server 603 calculates a current location of the user, the beacon device 601, or a combination thereof. In one implementation, a current location of the user may be automatically determined by using triangulation or quadrangulation techniques.

The server 603 then calculates a route from the current location of the user and/or the beacon device 601 to a desired destination point of the user. Further, the server 603 selects guidance beacon sensors 605 along the calculated route. In one scenario, the beacon sensors 605 may be pre-installed in the system encompassing the location of the wearable beacon device 601, the destination point, or a combination thereof. In one embodiment, the beacon sensors 605 may be stationary sensors, for example, the beacon sensors 605 may be installed on walls, ceiling, and the like. In another embodiment, the beacon sensors 605 may be mobile sensors. For example, a track is installed on a ceiling of a physical space and beacon sensors 605 move on the track to navigate a user to a destination point.

The server 603 then activates these beacon sensors 605 to provide the guidance information to the user, the beacon device 601, or a combination thereof. Also, obstacles and cliffs in the calculated route are detected, which may be provided as the guidance information to the user. In one embodiment, the beacon sensors 605 may use radars, infrared transceivers, etc. to detect the obstacles and/or cliffs. In one implementation, an audio alert system may be associated with the beacon sensors 605, which may be used to provide auditory guidance information to the users. The auditory guidance information may be provided in the form of, but is not restricted to, a beep, a tone, a computerized speech, a customized voice of a family member, etc. In another embodiment, a visual alert system may be associated with the beacon sensors 605, which may be used to provide visual guidance information to the users, for example, through a light, a navigation signs on a display device and/or the wearable beacon device 601, etc. In another embodiment, the beacon sensors 605 may be associated with an audio alert system and a visual alert system to provide visual and auditory guidance information to the user along the route.

Figure 7A:
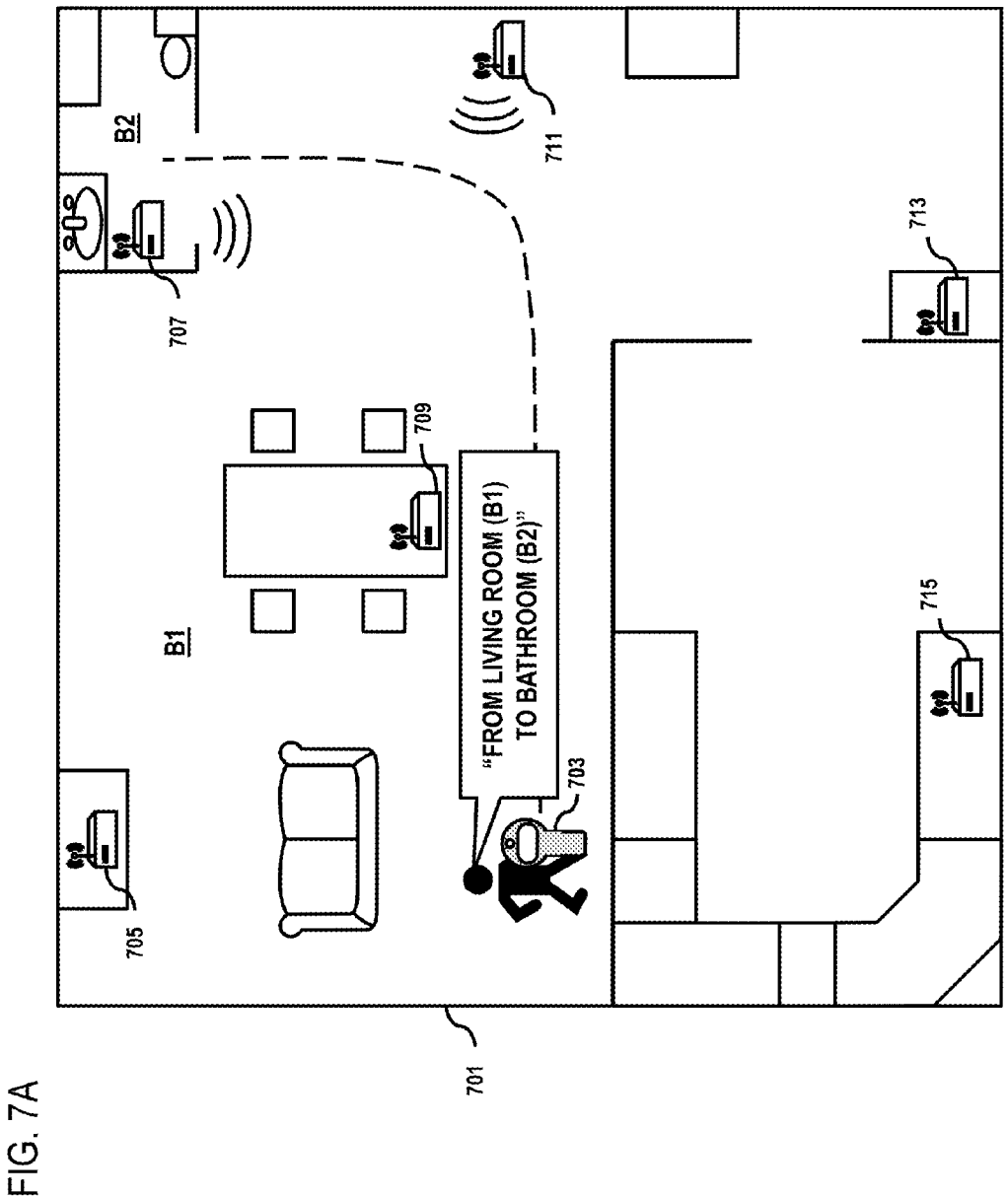
FIGS. 7A-7B illustrate an exemplary scenario for providing guidance information to a user inside a physical space, according to one embodiment.
Figure 7B:
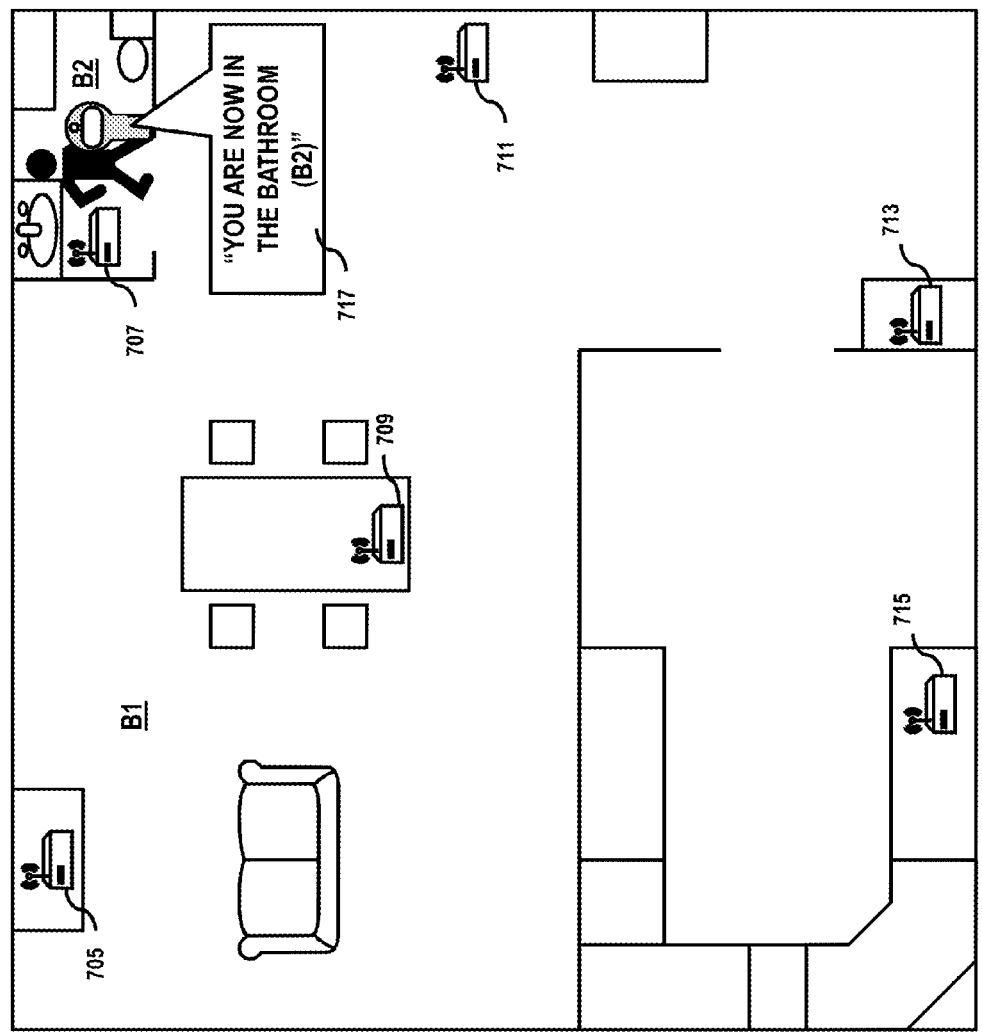

FIGS. 7A-7B illustrate an exemplary scenario for providing guidance information to a user inside a physical space, according to one embodiment. A user having a beacon device 703 is currently present in a living room (B1) of the home. Guidance beacons 705-715 are pre-installed at different locations in the home, for example, in living room (B1), bathroom (B2), bedroom, etc. In one embodiment, the guidance beacons 705-715 are installed on walls, ceiling, etc. of the home. The user requests to navigate from the living room (B1) to the bathroom (B2) through the beacon device 703. The user may provide a natural language input such as "from living room to bathroom" through a speech to the beacon device 703. The beacon device 703 transmits the request to a server (not shown) that calculates a route from the living room (B1) to the bathroom (B2) and select appropriate guidance beacons 707 and 711 installed along the route.

As shown in FIG. 7A, the user is located near a guidance beacon 709 and has to cross the guidance beacon 711 to reach to the bathroom (B2) where the guidance beacon 707 is installed. As the user crosses the guidance beacon 709, next guidance beacon 711 is now activated, which then provides guidance information, for example, through an audio alert system, to the user to turn left for the bathroom (B2). Thereafter, when the user crosses the guidance beacon 711, it is reset and the next guidance beacon 707 is activated. When the user reaches the bathroom (B2), the guidance beacon 707 provides an auditory guidance information 717 such as 'you are now in the bathroom (B2)' to the user.

Figure 8A:
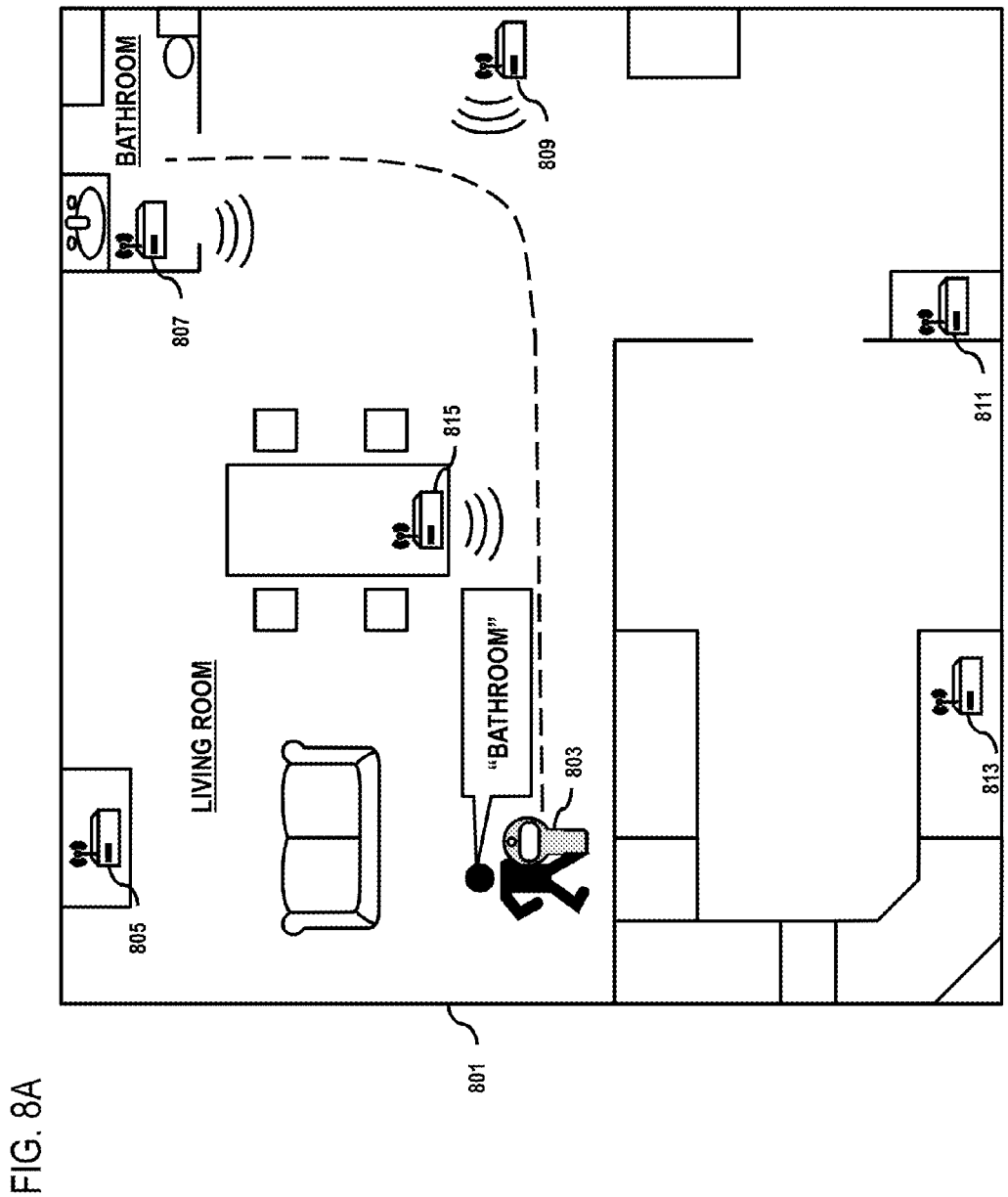
FIGS. 8A-8B illustrate an exemplary scenario for providing guidance information to a user inside a physical space, according to another embodiment.
Figure 8B:
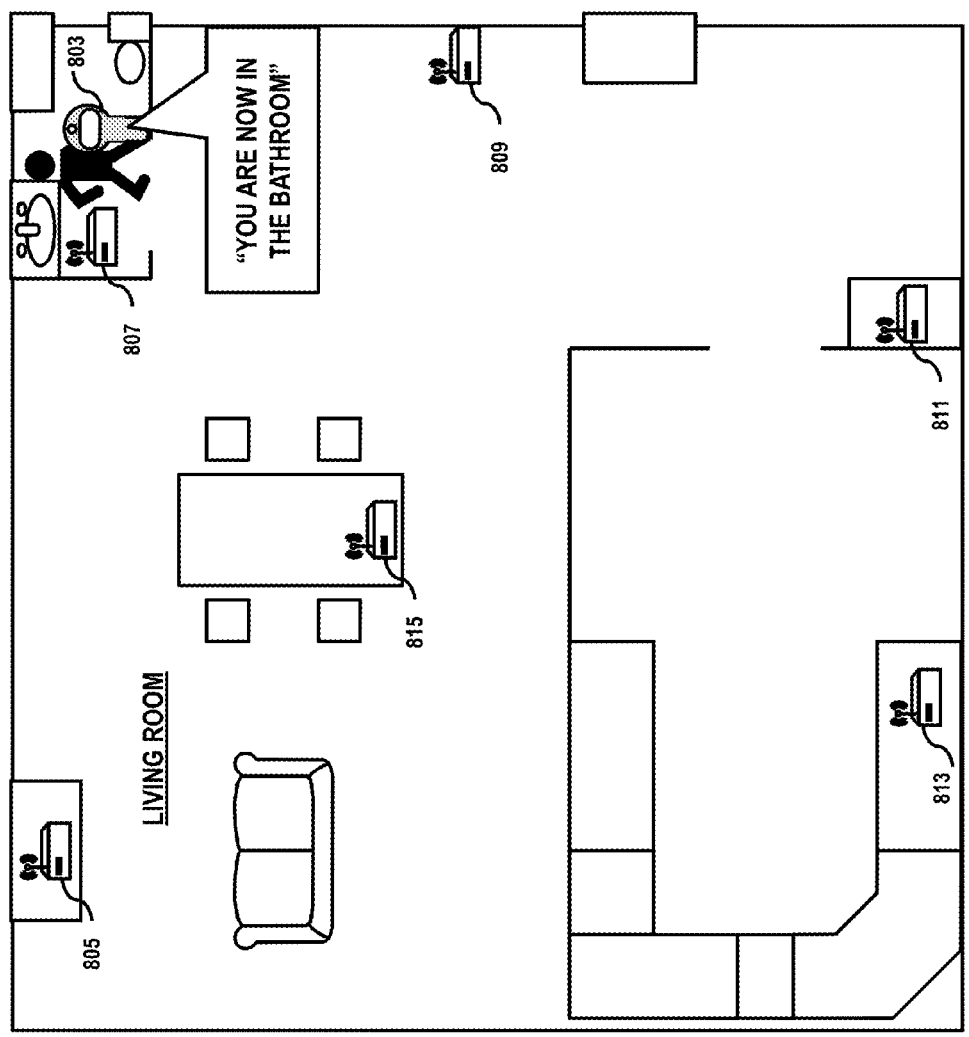

FIGS. 8A-8B illustrate an exemplary scenario for providing guidance information to a user inside a physical space, according to another embodiment. A user having a beacon device 803 is present in a living room (B1) of the home. Guidance beacons 805-815 are pre-installed at different locations in the home, for example, in a living room, a bathroom, a bedroom, etc. In one embodiment, the guidance beacons 805-815 are installed on walls, ceiling, and the like in the home. The user requests to navigate to the bathroom through the beacon device 803. The user may provide a natural language input such as "bathroom" by pressing a Push-to-talk (PTT) button of the beacon device 803.

The beacon device 803 transmits the input to a server (not shown). The server then automatically determines a current location of the user within the home. In one embodiment, the server may determine the user location by using triangulation or quadrangulation techniques. In one scenario, it is determined that the user is currently located in the living room. The server then calculates a route from the living room to the bathroom and selects appropriate guidance beacons 807, 809, and 815 installed along the calculated route.

As shown in FIG. 8A, the guidance beacon 815 is located nearest to the user provides a first visual alert to the user. For example, first auditory guidance information such as a text 'go straight for 10 meters' is provided by the guidance beacon 815 to the user. When the user crosses the guidance beacon 815, it is reset and a next guidance beacon 809 is activated to provide the auditory guidance information to the user. In one embodiment, sensors such as heat sensors, motion sensors, etc. installed in the guidance beacons are utilized to sense the location of the user, the beacon device 803, or a combination thereof. The guidance beacon 809 then provides second auditory guidance information such as 'turn left for the bathroom', which is reset when the user crosses the guidance beacon 809. Thereafter, the next guidance beacon 807 installed in the bathroom is activated. When the user reaches the bathroom, third auditory guidance information such as 'you are now in the bathroom' is provided by the guidance beacon 807.

Figure 9:
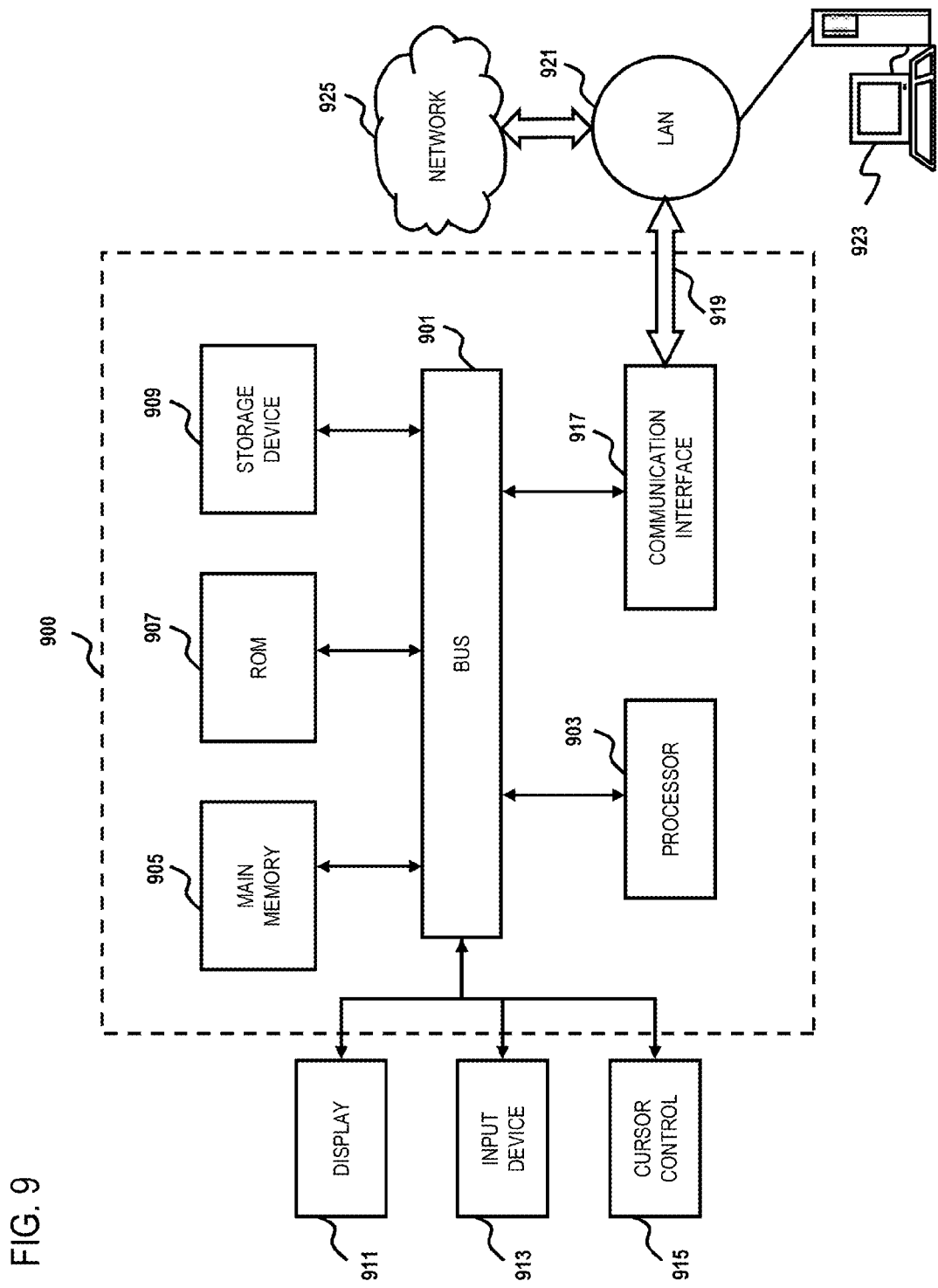
FIG. 9 is a diagram of a computer system that can be used to implement various exemplary embodiments.

FIG. 9 illustrates a computing hardware (e.g., mobile system) 900 on which exemplary embodiments may be implemented. The mobile system 900 includes a bus 901 or other communication mechanism for communicating information and a processor 903 coupled to the bus 901 for processing the information. The mobile system 900 also includes a main memory 905, such as a Random Access Memory (RAM) or other dynamic storage device, coupled to the bus 901 for storing the information and instructions to be executed by the processor 903. The main memory 905 may also be used for storing temporary variables or other intermediate information during execution of instructions by the processor 903. The mobile system 900 may further include a Read Only Memory (ROM) 907 or other static storage device coupled to the bus 901 for storing static information and instructions for the processor 903. A storage device 909, such as a magnetic disk or an optical disk, is coupled to the bus 901 for persistently storing information and instructions.

The mobile system 900 may be coupled via the bus 901 to a display 911, such as a Cathode Ray Tube (CRT), a liquid crystal display, an active matrix display, or a plasma display, for displaying information to the mobile user. An input device 913, such as a keyboard including alphanumeric and other keys, is coupled to the bus 901 for communicating information and command selections to the processor 903. Another type of a user input device may be a cursor control 915, such as a mouse, a trackball, or cursor direction keys, for communicating direction information and command selections to the processor 903 and for controlling cursor movement on the display 911.

According to an exemplary embodiment, the processes described herein are performed by the mobile system 900, in response to the processor 903 executing an arrangement of instructions contained in the main memory 905. Such instructions may be read into the main memory 905 from another computer-readable medium, such as the storage device 909. Execution of the arrangement of instructions contained in the main memory 905 causes the processor 903 to perform the process steps described herein. One or more processors in a multiprocessing arrangement may also be employed to execute the instructions contained in the main memory 905. In alternative embodiments, hard-wired circuitry may be used in place of or in combination with software instructions to implement exemplary embodiments. Thus, exemplary embodiments are not limited to any specific combination of hardware circuitry and software.

The mobile system 900 may also include a communication interface 917 coupled to the bus 901. The communication interface 917 provides a two-way data communication coupling to a network link 919 connected to a Local Area Network (LAN) 921. For example, the communication interface 917 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 917 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, the communication interface 917 sends and receives electrical, electromagnetic, or optical signals that carry digital data streams representing various types of information. Further, the communication interface 917 may include peripheral interface devices, such as a Universal Serial Bus (USB) interface, a Personal Computer Memory Card International Association (PCMCIA) interface, etc. Although a single communication interface 917 is depicted in FIG. 9, multiple communication interfaces may also be employed.

The network link 919 typically provides data communication through networks to other data devices. For example, the network link 919 may provide a connection through the LAN 921 to a host computer 923, which has connectivity to a network 925 (e.g., a Wide Area Network (WAN) or the global packet data communication network now commonly referred to as the "Internet") or to data equipment operated by a service provider. The LAN 921 and the network 925 both use electrical, electromagnetic, or optical signals to convey information and instructions. The signals through the various networks and the signals on the network link 919 and through the communication interface 917, which communicate digital data with the mobile system 900, are exemplary forms of carrier waves bearing the information and instructions.

The mobile system 900 may send messages and receive data, including program code, through the network(s), the network link 919, and the communication interface 917. In the Internet example, a server (not shown) might transmit requested code belonging to an application program for implementing an exemplary embodiment through the network 925, the LAN 921 and the communication interface 917. The processor 903 may execute the transmitted code while being received and/or store the code in the storage device 909, or other non-volatile storage for later execution. In this manner, the mobile system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media may include, for example, optical or magnetic disks, such as the storage device 909. Volatile media may include a dynamic memory, such as the main memory 905. Transmission media may include coaxial cables, copper wire and fiber optics, including the wires that include the bus 901. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 10:
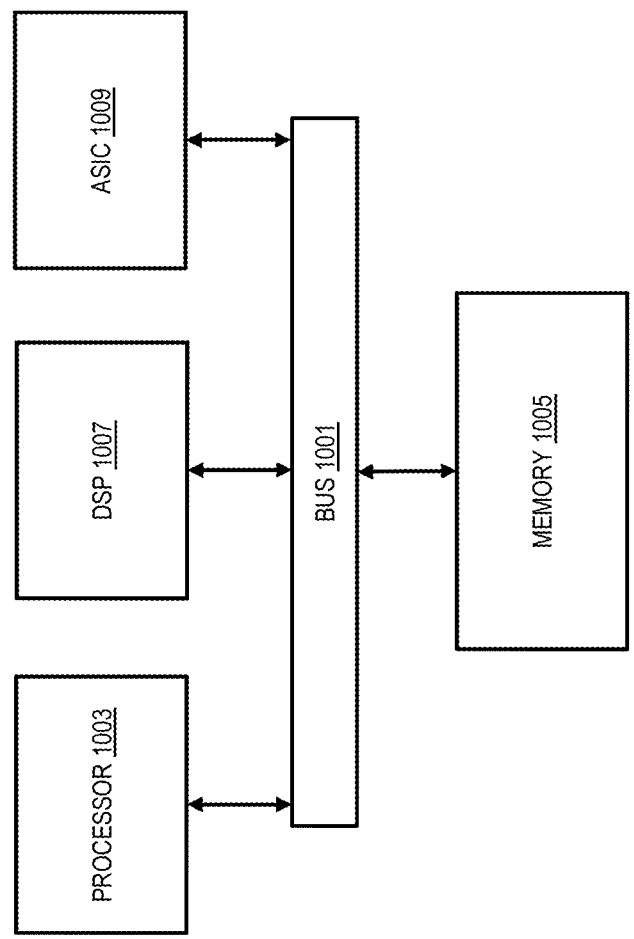
FIG. 10 is a diagram of a chip set upon which an embodiment of the invention may be implemented, according to one embodiment.

FIG. 10 illustrates a chip set 1000 upon which an embodiment of the invention may be implemented. The chip set 1000 is programmed to present a slideshow as described herein and includes, for instance, the processor and memory components described with respect to FIG. 9 incorporated in physical packages (e.g., chips). By way of example, a physical package may include an arrangement of materials, components, and/or wires on a structural assembly (e.g., a baseboard) to provide characteristics such as physical strength, conservation of size, and/or limitation of electrical interaction. It is contemplated that in certain embodiments the chip set 1000 can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include processing cores with each core to perform independently. A multi-core processor enables multiprocessing within a single physical package. Examples of the multi-core processor may include two, four, eight, or greater numbers of processing cores. Alternatively or in addition, the processor 1003 may include microprocessors configured in tandem via the bus 1001 to enable independent execution of instructions, pipelining, and multithreading. The processor 1003 may also be accompanied with specialized components to perform certain processing functions and tasks such as Digital Signal Processors (DSP) 1007, or Application-Specific Integrated Circuits (ASIC) 1009. The DSP 1007 typically processes real-world signals (e.g., sound) in real-time independently of the processor 1003. Similarly, the ASIC 1009 may perform specialized functions not easily performed by a general purposed processor. Other specialized components to aid in performing the inventive functions described herein include Field Programmable Gate Arrays (FPGA) (not shown), controllers (not shown), or other special-purpose computer chips.

The processor 1003 and accompanying components have connectivity to the memory 1005 via the bus 1001. The memory 1005 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 1005 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request via a device to navigate to a destination point;
   calculating a route from a location of the device to the destination point;
   selecting two or more guidance beacons based on the route, wherein at least one of the two or more guidance beacons is pre-installed on a track on a ceiling of a physical space;
   simultaneously activating the two or more guidance beacons to initiate a presentation of guidance information, the activating causing the selected two or more guidance beacons to begin displaying, simultaneously, a visual indicator indicating a presence of the two or more guidance beacons; and
   causing the at least one guidance beacon, installed on the track, to move on the track to assist with navigating the device to the destination point.

2. The method of claim 1, wherein the two or more guidance beacons are configured with an audio alert system, and wherein activating the two or more guidance beacons further comprises:
   activating the audio alert system, causing the audio alert system of the two or more beacons to output an audible indicator indicating a presence of the two or more guidance beacons.

3. The method of claim 2, wherein activating the audio alert system includes activating an audio alert associated with each guidance beacon, of the two or more guidance beacons, in sequence that is based on a progress of the device or the user along the route.

4. The method of claim 1, further comprising:
receiving another input for initiating a personalization of the guidance information for the user; and
presenting the guidance information based on the personalization.

5. The method of claim 1, further comprising:
processing one or more signals emitted by the device, at least one of the two or more guidance beacons, or a combination thereof to calculate a location of the device along the route.

6. The method of claim 1, further comprising:
requesting a user interaction with the two or more guidance beacons to indicate that the user has physically reached the one or more guidance beacons.

7. The method of claim 1, further comprising:
sensing an obstacle along the route via a sensor configured on at least one of the two or more guidance beacons,
wherein the guidance information includes information regarding the obstacle, and
wherein the sensor includes a heat sensor, a motion sensor, a radar sensor, or a combination thereof.

8. The method of claim 1, wherein causing the selected two or more guidance beacons to display the visual indicator includes causing the two or more guidance beacons to simultaneously activate a display device that is a physical component of the one or more guidance beacons.

9. An apparatus comprising a processor configured to:
receive a request via a device to navigate to a destination point;
calculate a route from a location of the device to the destination point;
select two or more guidance beacons based on the route, wherein at least one of the two or more guidance beacons is pre-installed on a track on a ceiling of a physical space;
simultaneously activate the two or more guidance beacons to initiate a presentation of guidance information, the activating causing the selected two or more guidance beacons to simultaneously present a visual indicator indicating a presence of the one or more guidance beacons; and
cause the at least one guidance beacon, installed on the track, to move on the track to assist with navigating the device to the destination point.

10. The apparatus of claim 9, wherein the two or more guidance beacons are configured with an audio alert system, and wherein the processor is further configured to:
activate the audio alert system, causing the two or more beacons to output an audible indicator indicating a presence of the two or more guidance beacons.

11. The apparatus of claim 10, wherein the processor is further configured to:
activate the audio alert system, of each of the two or more guidance beacons, in a sequence that is based on a progress of the device or the user along the route.

12. The apparatus of claim 9, wherein the processor is further configured to:
receive another input for initiating a personalization of the guidance information for the user; and
present the guidance information based on the personalization.

13. The apparatus of claim 9, wherein the processor is further configured to:
process one or more signals emitted by the device, the two or more guidance beacons, or a combination thereof to calculate a location of the device along the route.

14. The apparatus of claim 9, wherein the processor is further configured to:
request a user interaction with the one or more guidance beacons to indicate that the user has physically reached the one or more guidance beacons.

15. The apparatus of claim 9, wherein the request is received as a natural language input.

16. A system comprising:
a plurality of guidance beacons, each particular guidance beacon, of the plurality of guidance beacons, including a display device physically attached to the particular guidance beacon, wherein at least one of the plurality of guidance beacons is pre-installed on a track on a ceiling of a physical space; and
a platform configured to:
receive a request to calculate a route from a location, of a device, to a destination point,
calculate the route,
select at least two guidance beacons, of the plurality of guidance beacons, based on the route,
simultaneously activate the selected at least two guidance beacons to initiate a presentation of guidance information, the presentation including:
simultaneously outputting, via the display device physically attached to the at least two guidance beacons, a visual indicator indicating a presence of each of the at least two guidance beacons, and
cause the at least one guidance beacon, installed on the track, to move on the track to assist with navigating the device to the destination point.

17. The system of claim 16, wherein the two or more guidance beacons each include an audible alert system, wherein the platform is further configured to:
track a progress, of the device, along the calculated route; and
activate the audible alert system of the at least two guidance beacons in a sequence that is based on the progress of the device along the calculated route.

18. The system of claim 17, wherein the selected at least two guidance beacons include at least a first guidance beacon and a second guidance beacon, wherein the platform is further configured to:
detect, based on the tracking, that the device has reached the first guidance beacon; and
based on detecting that the device has reached the first guidance beacon, activate the audible alert system of the second guidance beacon.

* * * * *